United States Patent [19]

Puffr et al.

[11] 4,153,582

[45] May 8, 1979

[54] METHOD FOR THE PREPARATION OF POLYMERS OF LACTAMS HAVING AN ENHANCED ELECTRIC CONDUCTIVITY

[75] Inventors: Rudolf Puffr; Jan Sebenda, both of Prague, Czechoslovakia

[73] Assignee: Ceskoslovenska akademie ved, Prague, Czechoslovakia

[21] Appl. No.: 788,977

[22] Filed: Apr. 19, 1977

[30] Foreign Application Priority Data

Apr. 30, 1976 [CS] Czechoslovakia .................. 2864/76

[51] Int. Cl.$^2$ ......................... H01B 1/06; C08L 77/02
[52] U.S. Cl. ........................... 252/511; 260/32.6 NA; 260/37 N; 260/857 PE
[58] Field of Search ........... 252/511; 260/37 N, 78 L, 260/32.6 NA, 857 PE

[56] References Cited

U.S. PATENT DOCUMENTS

| | | | |
|---|---|---|---|
| 2,379,976 | 7/1945 | Maddock | 252/511 |
| 2,437,708 | 3/1948 | Plass et al. | 252/511 X |
| 2,597,741 | 5/1952 | Macey | 252/511 X |
| 2,683,669 | 7/1954 | Coler | 252/511 |
| 3,444,183 | 5/1969 | Hubbuch | 252/511 X |
| 3,563,916 | 2/1971 | Takashina et al. | 252/511 X |
| 3,571,777 | 3/1971 | Tully | 252/511 X |
| 3,704,280 | 11/1972 | van der Loos et al. | 260/78 L X |
| 3,763,077 | 10/1973 | Eusebi et al. | 260/78 L X |
| 3,833,534 | 9/1974 | Tierney et al. | 260/37 N |
| 3,883,469 | 5/1975 | Brassat | 260/37 N |
| 3,910,861 | 10/1975 | Wolvers et al. | 260/37 N X |

*Primary Examiner*—Herbert B. Guynn
*Attorney, Agent, or Firm*—Greenside & Schaffer

[57] ABSTRACT

The invention relates to a method for the preparation of polyamides with enhanced electric conductivity (specific resistance below $10^9 \Omega$.cm) by the anionic polymerization of lactams with 7 to 13 atoms in the ring using the usual basic polymerization initiators and accelerating activators. The polymerization is carried out in the presence of 2–20 wt. parts of plasticizers, e.g. N,N-dialkoxy or N,N-dialkylacrylamides or methacrylamides or their polymers, polyethyleneoxide, polyamides or lactams of higher concentration of amide groups than has the principal lactam, and 1–50 wt. parts of a very finely ground graphite and/or conductive black per 100 wt. parts of anhydrous principal lactam or mixture of lactams. The polymerization is performed in a mold to give directly the required article or in continuous reactors to various profiles or to form granulates. The semiconductive polyamide, which is the product of this invention, is suitable, for instance, for use as machine parts operating under conditions where the formation of electrostatic charges should be eliminated (e.g. in mines, chemical plants, etc.) or for articles where the conductivity is usefully employed (e.g. low temperature heating elements).

3 Claims, No Drawings

METHOD FOR THE PREPARATION OF POLYMERS OF LACTAMS HAVING AN ENHANCED ELECTRIC CONDUCTIVITY

SUMMARY OF THE INVENTION

The invention involves the preparation of polymers of lactams, as, for example, of 6-hexanelactam (hereinafter ε-caprolactam), 8-octanelactam (hereinafter capryllactam) and 12-dodecanelactam (hereinafter laurolactam), by direct anionic polymerization in the presence of fillers and plasticizers. The resulting polymers, being produced in the presence of a very finely ground graphite and/or conductive black, are characterized by having a specific electric resistance of $10^2$ to $10^9$ $\Omega$.cm. These polyamides are suitable especially for application in articles which require the exclusion of electrostatic charge formation or the semiconductivity which can be directly employed.

FIELD OF THE INVENTION

The dry polymers of lactams which contain 5 to 11 methylene groups between amide groups have approximately the electric resistance $R = 5 \times 10^{14}$ $\Omega$.cm. They are semicrystalline polymers with 30–60% of an ordered phase consisting of minute crystallites radially arranged in supermolecular spherulitic structures. The highest conductivity was found in the directions of crystallographic planes of hydrogen bridges and the lowest one along the carbon atom chain. However, the crystalline domains are not interconnected through the whole polymer but are interrupted by more or less continuous layers of unordered polyamide a few nm thick which are formed by irregular segments of chains at the surface of crystallites and between spherulites. To enhance the overall conductivity of the polyamide, it is enough to make the conductivity of these regions higher. However, the crystalline regions of the polymer, which have the most suitable properties of the polyamide, cannot be modified without substantial changes or even total destruction of the crystalline structure.

DESCRIPTION OF THE PRIOR ART

The increase of the electric conductivity of polyamide articles may be achieved essentially in two ways:

(1) By addition of low-molecular weight or high-molecular weight compounds which contain functional groups able to influence the transfer of electric charge. This way of lowering the electric charge in polymers is an objective of numerous patents related especially to textile applications where suppressing the resistance to the value $10^{10}$ $\Omega$.cm is usually sufficient. Various quaternary ammonium salts, phosphoric esters and amides, sulfonates and numerous compounds based on ethylene oxide found use as modifiers added predominantly into the previously prepared polymer (Chem. vlakna 23, 113 (1973) ). Electroconductive fillers, as for example graphite, carbon black (Czechoslovak Patent Application PV 7116-75) or metallic powders (V. E. Gul et al in "Elektroprovodyashchie polimernye materialy," Khimiya, Moscow 1968) are usually used in the plastics industry.

(2) It is known that increasing of the temperature of polyamides by 10° in the region 20°–80° C. leads to suppression of electric resistance by approximately one order. It may be assumed that the conductivity will be increased also by enhanced motion of the non-crystalline segment of the polyamide chain which is enabled by suitable plasticization. This may be achieved either by the incorporation of low-molecular weight or high-molecular weight plasticizers or by copolymerization.

As long as the polyamide remains crystalline, the added fillers and plasticizers are accumulated only in the non-crystalline regions and, consequently, their effective concentration is higher therein than the total concentration in the polyamide. This holds also for copolyamides containing only 5–10% of other segments, when neither the quality nor quantity of the crystalline regions is distinctly changed. However, the non-crystalline part increases with the increasing extent of copolymerization and the amount of added filler has to be proportionally increased to achieve the required electric conductivity.

Water is the natural modifier of electric conductivity of those polyamides which are hygroscopic. It acts both as a transfer agent of charge and as a plasticizer. For example, poly(ε-caprolactam) containing 50% of crystalline regions absorbs, in equilibrium with a medium of relative humidity increasing from 0 to 100%, zero to 12% of water, which fact leads to the decrease of R from $10^{14}$ to $10^8$ $\Omega$.cm. The sorption of water and the parallel effect on conductivity decreases with a decreasing concentration of amide groups in the polyamide. Thus, polylaurolactam of a crystallinity of 50% absorbs only a maximum of 2.3% of water.

Naturally, those plasticizers and comonomers will be the most suitable which increase also the hygroscopicity of the polyamide at the same time. In actual applications, it must be however considered whether the dependence of electrical conductivity on the humidity of the medium is favorable or disadvantageous. Also, the method of plasticizing has to be selected with respect to the application of the article. The low-molecular weight hydrophilic plasticizers, for example, are washed out by water. This result, which would be disadvantageous in textile applications, is not too disturbing in the case of bulky articles where the loss in plasticizer on the washed surface can be replenished by diffusion from the inside, so that this elution need not influence perceptibly the original values of surface conductivity. However, the use of high molecular weight plasticizers or plasticizing by copolymerization is more suitable for permanent reduction of resistance.

DETAILED DESCRIPTION

The objective of this invention is to provide a method for the preparation of polyamides with a specific electrical resistance of $10^2$–$10^9$ $\Omega$.cm in a single process, namely by polymerization of a lactam in the presence of the usual anionic initiators and in the presence of conductive fillers and plasticizers. To 100 wt. parts of a molten lactam are added 2–20 wt. parts of a copolymerizing lactam and/or a low-molecular weight or polymeric plasticizer at a temperature of 70°–170° C. 1–50 wt. parts of graphite and/or high-structural black are then dispersed in the mixture, one of the usual anionic polymerization catalysts is added, and the mixture is allowed to polymerize in continuous reactors at a temperature of 220°–250° C. or in molds at a starting temperature of 135°–180° C. for 0.5–10 h including the time required for crystallization and cooling. The resulting product is in the form of polyamide granules, tape, string, foil, or other profile in the continuous process or, in the case of adiabatic polymerization in molds (so-called pressureless monomer casting polymerization), the article of desired final shape is produced directly. In comparison with the methods used until now, the increase in conductivity is achieved by the cooperative effect of two types of modifiers: graphite ground as fine as possible (advantageously to particles below 5 $\mu$m) and/or the conductive high-structural black, on the one hand, and the copolymerizing lactam or polyamide with higher concentration of amide groups in the monomeric unit than has the principal lactam and/or N,N-dialkoxy or dialkyl acrylamides, methacrylamides or their polymers, polyethyleneglycol (hereinafter polyethyleneoxide) and its derivatives, on the other.

Because the anionic polymerization of lactams is involved, all compounds interfere which are more acidic than is the amide hydrogen. Therefore, it is necessary to dry the monomer and modifiers to be added, to work in an anhydrous medium, and to neutralize any acid groups with an adequately increased amount of initiating base.

The basic polymerization initiators are usually selected from the group consisting of alkali metals or their basic compounds, such as sodium $\epsilon$-caprolactam, sodium hydride, sodium aluminium alkoxy hydride. In order to enhance the rate of polymerization, activators (called also cocatalysts), such as N-acetyl-$\epsilon$-caprolactam, N,N'-terephtaloyl-bis-($\epsilon$-caprolactam), phenylisocyanate, its cyclic trimer or others isocyanates are usually added.

As is evident from the following examples, the filling of polyamides with graphite or black combined with plasticizing reduces the electric resistance intensively. Polyamides of the required conductivity may be prepared in this way with a minimum concentration of modifiers, so that the mechanical properties of the polyamides are not unfavorably affected by excessive filling. On the contrary, e.g. the impact strength is greatly improved. These polymers can be also readily machined. Another advantage of the invention consists in the preparation of semiconductive polyamides in a single operation. The dispersion of the filler in the process of this invention and the resulting conductivity is always better than is obtained in the usually used mixing of fillers with a viscous polymer melt which requires, in addition, costly mixing equipment. Moreover, any such remelting causes deterioration in the quality of a polymer which is as sensitive to degradation as polyamides are.

The semiconductive polymers of lactams in the form of castings or pressings of various sizes are suitable for engineering applications as movable, friction or sliding parts of machines and apparatus in those cases in which the formation of an electrostatic charge has to be prevented. Equipment for use in explosive environments in mines (conveyer belts, bearings, jackets of pneumatic picks and drills) or chemical plants (pipelines, containers, shields of tools and machines) serve as examples. The electric conductivity may be directly utilized, for example, in various low-temperature heating elements (e.g. for brooders, electric cushions, special garments, heating plates).

EXAMPLE 1

A forerun (30 g) was removed by vacuum distillation from 1030 g of technical-grade $\epsilon$-caprolactam. The remaining 1000 g, 6 g of sodium $\epsilon$-caprolactam and 50 g of dry polyethyleneglycol of molecular weight 6000 (PEG-6000) were mixed and 100 g of dry graphite of CR-2 type (microground graphite containing a min. 50% of the fraction of grain size below 0.002 mm which was pre-dried for 1 hour at 150° C. in a hot air drier) were added with stirring. The temperature was then raised to 150° C. and 3.6 ml of N-acetyl-$\epsilon$-caprolactam were admixed. All operations were carried out in a nitrogen atmosphere. The suspension was then poured into a mold preheated in an oven to 178° C. and allowed to polymerize (without a nitrogen atmosphere, only with the covered mold inlet). The temperature increased during 45 min to 206° C. by the evolved polymerization and crystallization heat. The mold was then removed from the oven and allowed to cool for 0.5 to 3 h and then the casting was able to be tipped out. The resulting black polymer contained 6% of water extractables and had the specific surface resistance $R = 4 \times 10^4$ $\Omega$. The reference polyamide prepared in the same way, but with the PEG addition being omitted, had $R = 2.5 \times 10^9$ $\Omega$; and a corresponding polymer, modified only with the addition of PEG-6000 and without graphite addition, had $R = 4 \times 10^{10}$ $\Omega$.

EXAMPLE 2

Into a melt of 150 g of capryllactam in a glass cylindrical reactor, 7.5 g of polyethyleneglycol PEG-6000, 1.5 ml of a 3 M benzene solution of NaAlH$_2$(OCH$_2$CH$_2$OCH$_3$)$_2$ ("Synhydrid," Synthesia - Kolin, Czechoslovakia), 22.5 g of graphite CR-2 and 0.3 ml of N-acetyl-$\epsilon$-caprolactam were successively added. The reactor was immersed into a bath of temperature 180° C. for 1 hour and then allowed to cool. The polymer contained 3.7% of water-extractables and had $R = 1 \times 10^6$ $\Omega$. The similar sample, prepared without the addition of PEG, exhibited $R = 4 \times 10^{11}$ $\Omega$.

EXAMPLE 3

Into a melt of 40 g of laurolactam were added 0.4 ml of Synhydrid, 2 g of polyethyleneglycol PEG-3000, and 6 g of graphite CR-2 at 170° C. and, after complete mixing, 0.08 ml of N-acetyl-$\epsilon$-caprolactam was added. The polymer resulting after 2 h at 240° C. contained 3.8% of boiling water extractables and exhibited $R = 1 \times 10^5$ $\Omega$.

EXAMPLE 4

Synhydrid (14 ml) was added to 1000 g of dry $\epsilon$-caprolactam (technical grade) at 120° to 150° C.; 50 g of polyethyleneglycol (PEG 3000–6000) were dissolved in the melt, 50 g of graphite CR-2 were admixed, and, eventually, 3.5 g of the cyclic trimer of phenylisocyante were added. The mixture, at 135° to 170° C., was stirred for 1 to 2 minutes and then poured into a mold heated to 170° to 200° C. and allowed to polymerize there for 0.5 h and then to cool. The surface resistance of the casting was $R = 2 \times 10^7$ $\Omega$.

EXAMPLE 5

A suspension of 8 g of graphite CR-2 in 72 g of $\epsilon$-caprolactam and 7.2 g of N,N-diethylacrylamide was heated to 150° C. with stirring for 2 h and then 3.5 ml of Synhydrid and 0.38 g of the cyclic trimer of phenylisocyanate were added. The stirrer was removed and the mixture was polymerized for 2 hours at 200° C. and then allowed to cool. The resulting polyamide contained 9% of boiling water extractables, and had the electric resistance $R = 5 \times 10^6$ $\Omega$ and reduced viscosity of 2.96 (extracted polymer in m-cresol, 25° C.).

EXAMPLE 6

To a suspension of 1.4 g of ketene black (Akzo, Amsterdam) in 70 g of ε-caprolactam and 3.5 g of N,N-diethylacrylamide, which was heated for 1 h to 115° C., were added 3.5 g of polyethyleneglycol PEG-1800 (with $NH_2$ terminal groups introduced by cyanoethylation and hydrogenation of PEG), 1 g of N,N-terephthaloyl-bis-(ε-caprolactam) as activator and, after several minutes, 1.8 ml of Synhydrid. The polyamide obtained after 2 hours of polymerization at 190° C. contained 5% of boiling water extractables and had $R=2\times10^6$ Ω. The similar polymer prepared without acrylamide had $R=1\times10^9$ Ω and, if also the addition of PEG was omitted, $R=1\times10^{11}$ Ω.

EXAMPLE 7

Crystalline graphite (7.5 g) and 7.5 g of acetylene black P-1250 (East Germany) were stirred into a solution consisting of 100 g of ε-caprolactam, 7.5 g 2-pyrrolidone and 2.3 g of sodium ε-caprolactam; 1.2 ml of N-acetyl-ε-caprolactam was added, the mixture was heated to 200° C. for 10 min and was then allowed to polymerize for 6 hours at 150° C. The polymer contained 7.7% of boiling water extractables, exhibited $R=1\times10^5$ Ω, and had a higher impact strength than the similar polyamide produced without the copolymerizing 2-pyrrolidone, which has $R=5\times10^8$ Ω only.

EXAMPLE 8

Graphite CR-2 (7.5 g) was dispersed in a mixture consisting of 30 g of capryllactam, 3 g of ε-caprolactam, and 0.37 ml of Synhydrid at 120° C., and 0.12 ml of N-acetyl- ε-caprolactam was added. The polymer, which was allowed to cool after 0.3 h of polymerization at 260° C., contained 2.8% of boiling water extractables and had $R=2\times10^6$ Ω. If caprolactam is omitted, the resulting R is $1\times10^7$ Ω only, and the polymer is brittle.

EXAMPLE 9

Molten dry ε-caprolactam containing 0.6 ml. % of Synhydrid and molten ε-caprolactam containing 0.2 mol. % of Desmodur R (Triphenylmethane-4,4',4''-triisocyanate, Bayer, West Germany) were metered at the same flow velocity (4 kg/h) from separate containers by gear pumps into a heated mixer, which was equipped with a stirrer and a metering funnel. The funnel provided admixing of granulated graphite at the rate of 0.8 to 5 kg/h. Advantageously, the microground graphite (e.g. CR-2), which was dried and bonded for granulation with 10–50 wt. % of polyethyleneoxide (PEO), was used. The optimum concentration of PEG in the resulting mixture is 8–3% and that of graphite 5–35 wt. %. The resulting suspension was then forced by a gear pump into a short tubular reactor heated to 220°–240° C., where the polymerization proceeded during several minutes of residence. The melt was extruded through a nozzle into a crystallization bath (cold water) and the tape of polymer was chopped to form a granulate. The samples containing 8% of PEO and 5 or 35% of graphite exhibited the specific electric resistances $10^7$ and $10^2$ Ω.cm, respectively.

EXAMPLE 10

A first heated container equipped with a stirrer was charged with 20 kg of ε-caprolactam, 1 kg of polyethyleneglycol (PEG 6000), 0.14 kg of sodium ε-caprolactam, and 0.75 kg of high-structural conductive black. A second analogously equipped container was charged with 4 kg of ε-caprolactam and 0.19 kg of the cyclic trimer of phenylisocyanate. After both charges were heated and melted at 80°–100° C., the pumping of melt from the first container into a mixing vessel started at the rate of 2.19 kg/h, while the melt from the second container was similarly pumped at the rate of 0.419 kg/h. The resulting mixture was then extruded through a gear pump and a nozzle at 230° C. to give a string of diameter 3–4 mm, which crystallized on cooling to 190° C., and was chopped to form a granulate. The granulate was postpolymerized for 2 to 5 h by heating to 180°–190° C. in an inert atmosphere. The resulting polymer contained less than 2% of monomer, had the surface resistance $10^5$ Ω and was suitable for injection molding.

EXAMPLE 11

Poly(N,N-dimethoxymethyl acrylamide) (0.5 g) and 0.01 g of sodium hydride were disolved in 10 g of dry ε-caprolactam at 100°–120° C. After 1.1 g of dry graphite, typ CR-2 and 0.035 ml of N-acetyl-ε-caprolactam was mixed into this solution, the temperature was raised to 190° C. for 1 h. Resulting polymer exhibited $R=1.10^7$ Ω.

EXAMPLE 12

Into a solution of 7 g of N-methoxymethylated Nylon 6 (molecular weight 8000) in 100 g of molten capryllactam were added 1.2 ml of Synhydrid and 4 g of ketene black at 120° C. and after complete mixing, 0.25 ml of phenylisocyanate was added. The polymer resulting after 0.5 h at 190° C. had $R=1.10^7$ Ω.

EXAMPLE 13

Synhydrid (2.1 ml) was added to 100 g of laurolactam and 15 g of ε-caprolactam at 160° C., 5 g of copolymer of N,N-dibutyl methacrylamide and N,N-dibutyl acrylamide (1:1) were dissolved in the melt, 40 g of graphite CR-2 were admixed and 0.34 ml of N-acetyl-ε-caprolactam were added. The stirrer was removed and the mixture was polymerized for 2 h at 220° C. and then allowed to cool. The resulting polyamid exhibited $R=1.10^4$ Ω.

The mentioned electric resistances were measured at 25° C. with samples conditioned at a relative humidity of 50% on milled and smooth faces by means of the megohmeter type BM 283 (Tesla, Czechoslovakia) and pressing electrodes from conductive rubber at 100 V. The resistances below $10^4$ Ω were measured at 4 V with electrodes from silver paste.

What is claimed is:

1. Method for the preparation of semiconductive polyamides, having a specific electric resistance, measured at relative humidity of 50% and 25° C., of below $10^9$ Ω.cm, by anionic polymerization comprising first forming a dispersed admixture of 100 weight parts of at least one anhydrous molten lactam containing 7–13 atoms in the ring, a basic polymerization initiator, an accelerating activator, 2–20 weight parts of at least one anhydrous hydrophilic plasticizer selected from the group consisting of N,N-dialkoxyacrylamide, N,N-dialkylmethacrylamide, N,N-dialkylacrylamide, N,N-dialkoxymethacrylamide and polyethylene glycol, and 1 to 50 weight parts of a material selected from the group consisting of finely ground graphite and conductive black, and subsequently polymerizing said admixture.

2. Method as set forth in claim 1, wherein said graphite has average particle size less than 5 μm.

3. Polymers with enhanced electric conductivity prepared according to the method set forth in claim 1.

* * * * *